(12) United States Patent
Steinmetz et al.

(10) Patent No.: US 11,686,381 B1
(45) Date of Patent: Jun. 27, 2023

(54) COMPOSITE GEAR ASSEMBLY AND METHOD OF MAKING SAME

(71) Applicant: Cornerstone Research Group, Inc., Miamisburg, OH (US)

(72) Inventors: Ethan Steinmetz, Beavercreek, OH (US); Ben Dietsch, Kettering, OH (US); Gray Fowler, Allen, TX (US); Jason Hermiller, Lebanon, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 92 days.

(21) Appl. No.: 17/314,628

(22) Filed: May 7, 2021

Related U.S. Application Data (60) Provisional application No. 63/021,888, filed on May 8, 2020.

(51) Int. Cl.
| | | |
|---|---|---|
| *F16H 55/06* | (2006.01) | |
| *F16H 57/00* | (2012.01) | |
| *B29C 70/84* | (2006.01) | |
| *B29K 307/04* | (2006.01) | |
| *B29L 15/00* | (2006.01) | |

(52) U.S. Cl.
CPC ............ *F16H 55/06* (2013.01); *B29C 70/84* (2013.01); *F16H 57/0025* (2013.01); *B29K 2307/04* (2013.01); *B29L 2015/003* (2013.01); *F16H 2055/065* (2013.01)

(58) Field of Classification Search
CPC ........ F16H 55/06; F16H 57/0025; F16H 1/14; B29C 70/84
See application file for complete search history.

(56) References Cited

U.S. PATENT DOCUMENTS

| | | | | |
|---|---|---|---|---|
| 3,461,737 | A * | 8/1969 | Lukawich | ............... F16H 55/06 74/443 |
| 3,709,530 | A * | 1/1973 | Redding | ............. F16H 57/0025 403/375 |
| 9,296,157 | B1 * | 3/2016 | Handschuh | ............. F16H 55/06 |
| 9,310,770 | B2 | 4/2016 | Verardo et al. | |
| 2007/0214642 | A1 | 9/2007 | Meijer et al. | |
| 2018/0259000 | A1 * | 9/2018 | Chung | .................... F16D 1/101 |
| 2019/0048984 | A1 * | 2/2019 | Anderson | ............... F16H 55/17 |
| 2020/0158182 | A1 * | 5/2020 | Völker | .................... F16C 3/023 |
| 2021/0308806 | A1 * | 10/2021 | Vasu | .................... B23K 9/0282 |

* cited by examiner

*Primary Examiner* — Terence Boes
(74) *Attorney, Agent, or Firm* — Dinsmore & Shohl LLP (57) ABSTRACT

A composite hybrid gear assembly includes a gear hub formed from a composite material and a gear head assembly. The gear hub includes a shaft region having an axially symmetrical external profile and a hub web region having a flared profile extending from the shaft region. The gear head assembly includes a head web region and a teeth region where the gear head assembly is fixed to the gear hub. Additionally, the composite hybrid gear assembly includes a first sleeve fixed to an external surface of the shaft region. An associated method of making a composite hybrid gear assembly is also provided.

19 Claims, 5 Drawing Sheets

COMPOSITE GEAR ASSEMBLY AND METHOD OF MAKING SAME

CROSS-REFERENCE TO RELATED APPLICATIONS

This application claims priority to U.S. Provisional Application 63/021,888, filed May 8, 2021, which is incorporated by reference herein in its entirety.

TECHNICAL FIELD

Embodiments of the present disclosure generally relate to composite hybrid gear assemblies and methods of making the same and more particularly to composite hybrid gears having a gear hub formed from a composite material integrated with a metallic gear web and gear teeth.

BACKGROUND

The advancement of new variable speed transmission systems that greatly improve speed and efficiency have great potential for enabling development of new rotorcraft and aircraft that are faster, more efficient, and have greater flexibility in operations. These variable speed transmission systems utilize various gears as part of the system. However, currently, these all metal systems also add a large amount of weight to the aircraft, which is undesirable. In general, drive systems accounts for a large portion of helicopter weight, sometimes taking up about 30% of empty rotorcraft weight. With the increase in weight of the systems comes an increase in vibration and a need for more acoustic damping. Therefore, in order to reduce the noise, and to further increase the speed, lift capacity, and efficiency of the aircraft, there is a great need to reduce the weight in the rotorcraft transmission systems. The same weight challenges are presented with other devices which include variable speed transmissions or other systems utilizing gears.

One approach to reducing the weight of gears is to form a hybrid gear formed from a combination of a composite material and metal. Previous attempts at making hybrid spur gears that combined metal teeth and composite gear webs has focused on replacing steel bull gears with hybrid alternatives, which mainly experience biaxial forces. Attempts have been previously unsuccessful in making hybrid bevel gears, which experience more complex geometry and triaxial loading. The added complexity of such gear loading creates unique challenges to the composite design and the manufacturing methods in making the gears. For example, layered prepreg application may be appropriate to achieve the nearly flat web profile of a bull gear, but the same approach is not suitable for the more complex bevel gear geometry.

SUMMARY

As such, there are needs for composite hybrid gear assemblies which are capable of having complex geometries and withstanding triaxial loading.

Embodiments of the present disclosure relate to a composite hybrid gear assembly. The composite hybrid gear assembly includes a gear hub formed from a composite material. The gear hub includes a shaft region having an axially symmetrical external profile and a hub web region having a flared profile extending from the shaft region. The composite hybrid gear assembly additionally includes a gear head assembly comprising a head web region and a teeth region, the gear head assembly fixed to the gear hub. Further, the composite hybrid gear assembly includes a first sleeve fixed to an external surface of the shaft region of the gear hub.

Embodiments of the present disclosure also relate to a method of making a composite hybrid gear assembly. The method includes applying adhesive to a gear head assembly at the regions of contact between a gear hub and the gear head assembly, where the gear head assembly is formed from a metallic material. The method further includes constructing a preform formed from a dry fiber or a prepreg of the gear hub in a molding tool, the gear hub including a first shaft region having an axially symmetrical profile of a first external diameter, a second shaft region having an axially symmetrical profile of a second external diameter coaxial with the first shaft region and extending from the first shaft region, and a hub web region having a flared profile extending from the second shaft region. Further, the method includes mating the preform and the gear head assembly to sandwich at least a portion of a head web region of the gear head assembly between layers of the dry fiber reinforced preform to form a composite layup of hybrid gear assembly. If the preform is formed from dry fiber, the method includes infusing uncured resin into the preform. Finally, the method includes curing the preform to harden the adhesive and the uncured resin in the preform.

Embodiments of the present disclosure also relate to a further method of making a composite hybrid gear assembly. The method includes applying adhesive to a gear head assembly, a first sleeve, a second sleeve, and a third sleeve at the regions of contact between a gear hub and each of the first sleeve, the second sleeve, and the third sleeve, where the gear head assembly, the first sleeve, the second sleeve, and the third sleeve each are formed from metallic materials. The method further includes constructing a preform formed from a dry fiber or a prepreg of the gear hub in a molding tool, the gear hub including a first shaft region having an axially symmetrical profile of a first external diameter, a second shaft region having an axially symmetrical profile of a second external diameter coaxial with the first shaft region and extending from the first shaft region, and a hub web region having a flared profile extending from the second shaft region, where the first shaft region and the second shaft region are connected with a tapered region expanding from the first external diameter of the first shaft region to the second external diameter of the second shaft region and the gear hub further includes a first composite tab formed from the composite material. Additionally, the first sleeve is fixed to an external surface of the first composite tab, the second sleeve is fixed to an external surface of the second shaft region of the gear hub; the third sleeve is fixed to an external surface of the first shaft region of the gear hub, and the first composite tab includes an axially symmetrical geometry coaxial with the first shaft region and extending from the tapered region across at least a portion of an external surface of the third sleeve. The method additionally includes mating the preform with the first sleeve and the third sleeve to sandwich at least a portion of the first sleeve between the first shaft region and the first composite tab and at least a portion of the first composite tab between the first sleeve and the third sleeve to form a composite layup of hybrid gear assembly. If the preform is formed from dry fiber, the method includes infusing uncured resin into the preform. Finally, the method includes curing the preform to harden the adhesive and the uncured resin in the preform.

Embodiments of the present disclosure also relate to methods of making a composite hybrid gear assembly, where the method includes constructing a preform formed from a dry fiber or a prepreg of a gear hub in a molding tool, the gear hub including a shaft region having an axially symmetrical external profile and a hub web region having a flared profile extending from the shaft region. The method further includes laying the preform on a molding tool. If the preform is formed from dry fiber, the method includes infusing uncured resin into the preform. Additionally, the method includes curing the preform to harden the uncured resin in the preform. The method includes bonding the gear hub to a gear head assembly and a first sleeve, where the first sleeve and the gear head assembly are formed from metallic materials, by applying adhesive onto a bonding surface of the gear head assembly and the first sleeve. Subsequently, the adhesive is cured.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure generally relate to a composite hybrid gear assembly. The composite hybrid gear assembly integrates components formed form composite materials and components formed from metallic materials into a single integrated gear assembly with reduced weight while retaining desired mechanical properties. Specifically, implementation of composite materials to form components of the hybrid gear assembly allows for weight reduction by substituting the lighter weight composite materials for the traditionally heavier metallic components.

In accordance with embodiments of a composite hybrid gear assembly 10 and with reference to FIGS. 1 through 7B, the composite hybrid gear assembly 10 comprises a gear hub 100, a gear head assembly 200 and a first sleeve 300. The gear hub 100 comprises a shaft region 110 having an axially symmetrical external profile and a hub web region 130 having a flared profile extending from the shaft region 110. Axially symmetrical means the profile demonstrates symmetry about an axis. Examples of axially symmetrical profiles include cylindrical, tapered cylindrical, and flared profiles. The gear head assembly 200 comprises a head web region 210 and a teeth region 220. Further, the gear head assembly 200 is fixed to the gear hub 100. The first sleeve 300 may be fixed to an external surface of the shaft region 116 of the gear hub 100.

Having generally described the various components of the composite hybrid gear assembly 10, each component and sub-system will be described in further detail.

As previously indicated, gear hub 100 includes the shaft region 110 having an axially symmetrical external profile with a hollow, or tubular interior and the hub web region 130 having a flared profile extending from the shaft region 110. The gear hub 100 serves as the interface between a driveshaft or other power source (not shown) and the gear head assembly 200. As such, the gear hub 100 can be expected to experience a significant rotational or twisting force in the transfer of motion between the driveshaft and the gear head assembly 200. The gear hub 100 may be formed from a composite material to reduce the overall weight of the composite hybrid gear assembly 10 while maintaining the desired mechanical properties.

It will be appreciated that the gear hub 100 includes sections serving a function as a driveshaft (shaft region 110) and sections serving a function as gear hub or web (hub web region 130). This dual-functionality allows for greater reduction of weight in the overall system where the composite hybrid gear assembly 10 is implemented as a portion of the metallic driveshaft is effectively replaced with the lighter weight composite material used in the gear hub 100.

In one or more embodiments, the gear hub 100 includes a first shaft region 112 having an axially symmetrical external profile, a second shaft region 120 having an axially symmetrical external profile, and the hub web region 130 having a flared profile extending from the second shaft region 120. In one or more embodiments, the first shaft region 112 comprises a cylindrical profile with a first external diameter ($D_1$) and the second shaft region 120 comprises a cylindrical profile with a second external diameter ($D_2$). Throughout the present disclosure reference is made to external diameters, such reference implicitly includes reference to an average external diameter for non-cylindrical profiles with such average calculated as the mean of the smallest diameter and the largest diameter.

In one or more embodiments, the second external diameter ($D_2$) of the second shaft region 120 is larger than the first external diameter ($D_1$) of the first shaft region 112. The transition between the first shaft region 112 and the second shaft region 120 may be formed by a graduated shift between external shaft diameters. For example, in one or more embodiments, the first shaft region 112 and the second shaft region 120 may be connected with a tapered region 140 expanding from the first external diameter ($D_1$) of the first shaft region 112 to the second external diameter ($D_2$) of the second shaft region 120. It will be appreciated that the tapered transition of the shaft diameters afforded by the tapered region 140 reduces stress concentrations in the gear hub 100 when compared to stress concentration which would be expected with a stepped transition.

The second shaft region 120 having an external diameter larger than the external diameter of the first shaft region 112 allows for multiple bearings to be disposed along the length of the shaft region 110. Additionally, the tapered transition provides a mechanism for bearings to be firmly held in place along the shaft region 110 which is especially useful to counteract the thrust force experienced by the composite hybrid gear assembly 10 during operation. Such thrust force is especially pronounced with the operational parameters of bevel gears. The placement and orientation of bearings along the shaft region 110 of the gear hub 100 is discussed infra.

The gear hub 100 also includes the hub web region 130. The hub web region 130 has a flared profile and extends from the shaft region 110. The flared profile of the hub web region 130 allows the hub web region 130 to replicate or wholly provide a portion of the web of the gear.

In one or more embodiments, the hub web region 130 comprises a first flared portion 132 and a second flared portion 134. The first flared portion 132 extends from the shaft region 110 and is configured to match the desired slope of the web of the gear. The second flared portion 134 may extend from the first flared portion 132 and may be configured to match the slope of the teeth region 220 of the gear head assembly 200. It will be appreciated that alignment of the various parts of the hub web region 130 with various parts of the gear head assembly 200 allows for the gear hub 100 and the gear head assembly 200 to be mated and affixed together.

In one or more embodiments, the transitions between one or more of the shaft region 110 generally, the first shaft region 112, the tapered region 140, the second shaft region 120, and the hub web region 130 including the first flared portion 132 and the second flared portion 134 individually may include a curved transition 150. The curved transition 150 reduces stress concentrations in the composite material of the gear hub 100 as the point of the transition compared to a sharp corner, for example.

In various embodiments, the shaft region 110 may range in diameter from 1 to 10 inches, 1 to 8 inches, 1 to 6 inches, 1 to 5 inches, 1 to 4 inches, or 1 to 3 inches. Similarly, in various embodiments, the first shaft region 112 may range in diameter from 1 to 10 inches, 1 to 8 inches, 1 to 6 inches, 1 to 5 inches, 1 to 4 inches, or 1 to 3 inches. Further, in various embodiments, the second shaft region 120 may range in diameter from 2 to 10 inches, 2 to 8 inches, 2 to 6 inches, 2 to 5 inches, or 2 to 4 inches.

The first sleeve 300 is fixed to the external surface of the shaft region 116 of the gear hub 100. The first sleeve 300 provides a mating surface to connect a bearing to the first sleeve 300 to allow the gear hub 100 to be supported and held in position for operational utility. Further, in one or more embodiments, such as the embodiment illustrated in FIG. 1 through 3, a driveshaft may also be attached to the first sleeve 300 to transfer rotational motion from the driveshaft to the gear hub 100. Specifically, the first sleeve 300 has a primary purpose of providing a rigid surface to affix a bearing but in certain embodiments may additionally provide a rigid surface for affixing a hollow driveshaft.

Figure 1:
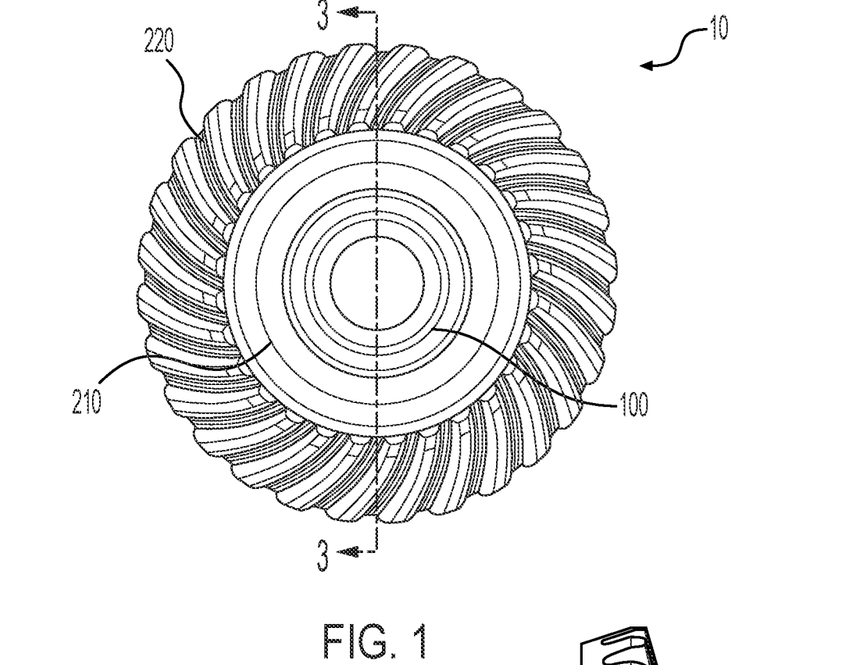
FIG. 1 is an illustration of a top profile of a composite hybrid gear assembly in accordance with one or more embodiments of the present disclosure.
Figure 2:
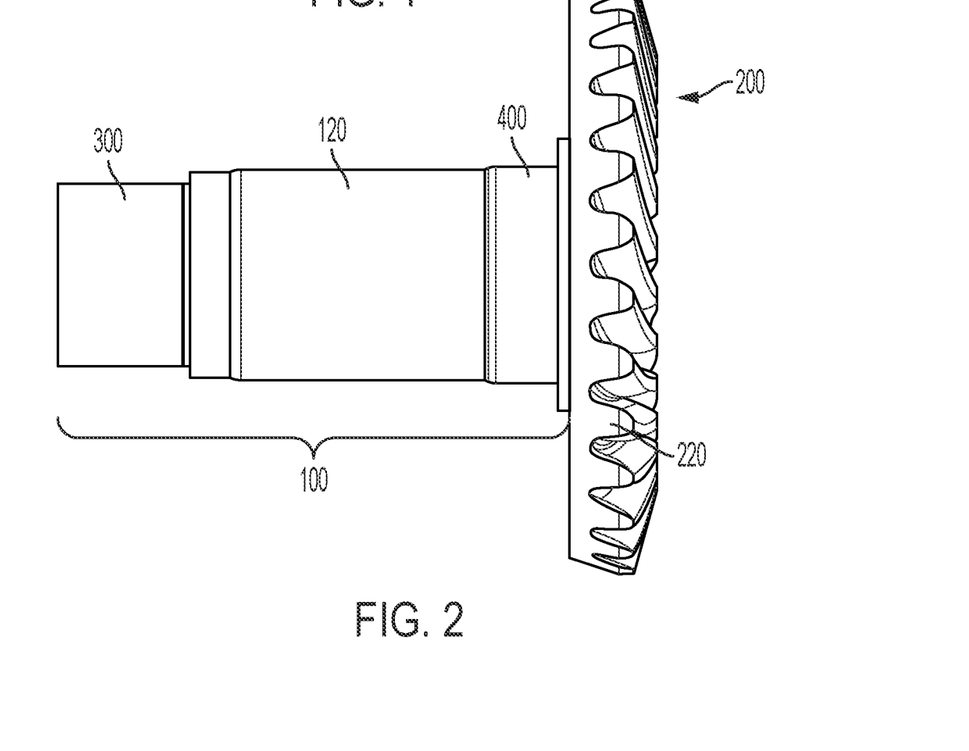
FIG. 2 is an illustration of a side profile of the composite hybrid gear assembly of FIG. 1.
Figure 3:
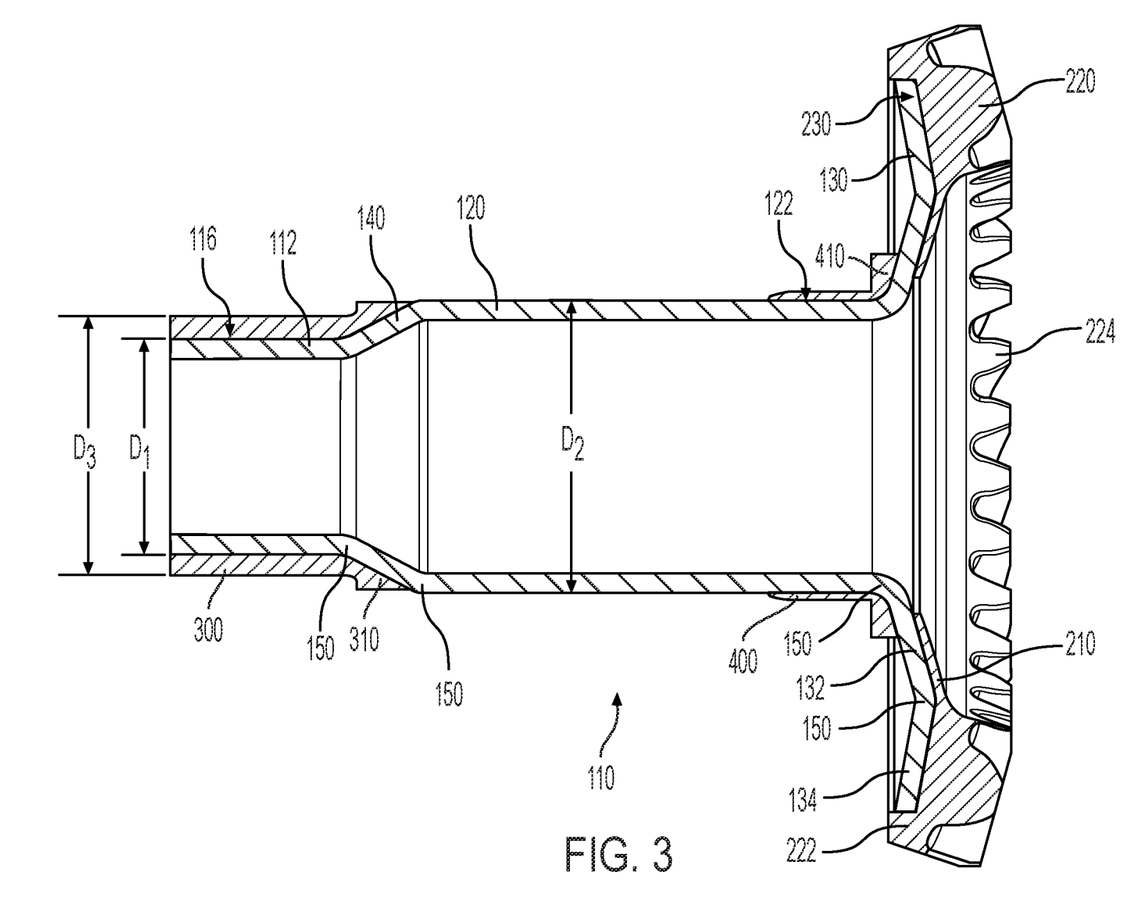
FIG. 3 is an illustration of a cut-view of the composite hybrid gear assembly of FIG. 1 along axis 3-3.
Figure 4:
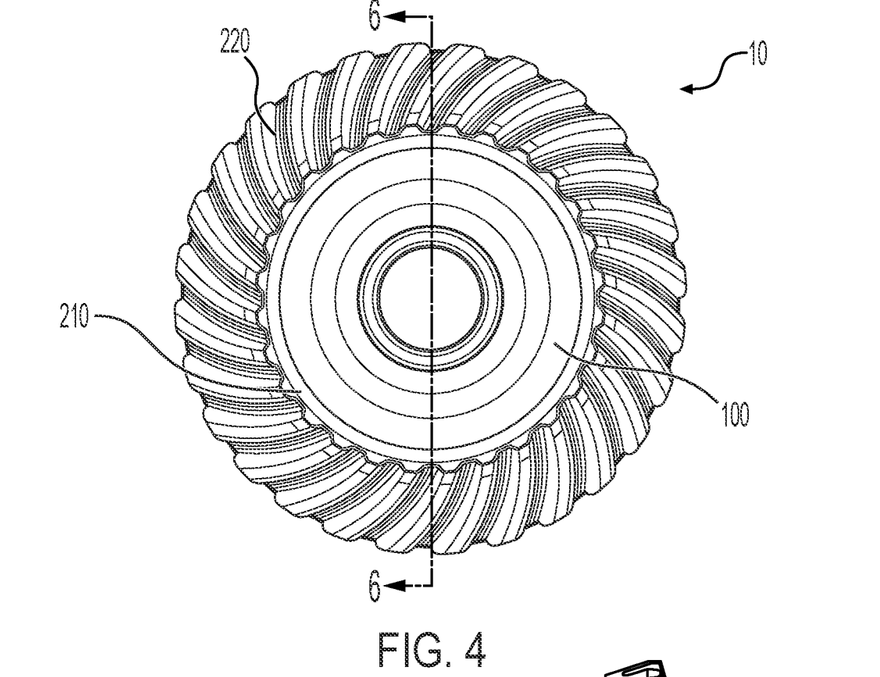
FIG. 4 is an illustration of a top profile of a composite hybrid gear assembly in accordance with one or more embodiments of the present disclosure.

The first sleeve 300 comprises a generally cylindrical profile. With reference to FIGS. 2 and 3, in one or more embodiments, the first sleeve 300 comprises an internal profile matching the external profile of the shaft region 110 and an external diameter represented by a third external diameter ($D_3$). Specifically, the internal profile of the first sleeve 300 may be sized to provide a snug fit against the first shaft region 112. The snug fit between the first sleeve 300 and the shaft region 110 allows the first sleeve 300 and the shaft region 110 to be secured together and form a laminated structure. In one or more embodiments, the specific portion of the shaft region 110 to which the first sleeve 300 is affixed is the first shaft region 112.

Further, in one or more embodiments and with continued reference to FIGS. 2 and 3, the first sleeve 300 may comprise an internal profile matching the external profile of the first shaft region 112 as well as an external profile of at least a portion of the tapered region 140. In doing so, the first sleeve 300 may extend over at least a portion of the tapered region 140 of the gear hub 100. Extending the first sleeve 300 over at least a portion of the tapered region 140 of the gear hub 100 provides a barrier to longitudinal translation of the first sleeve 300 along the gear hub 100. Specifically, as the tapered region 140 represents a region of increasing diameter of the gear hub 100, the first sleeve 300 may only be translated along the gear hub 100 until a location is reached where the external profile of the gear hub 100 impinges the internal profile of the first sleeve 300.

In one or more embodiments and with reference to FIGS. 2 and 3, the first sleeve 300 may be rotationally secured to the driveshaft. In such embodiments, the first sleeve 300 acts to both engage with the driveshaft and provide a mating surface to connect a bearing to the gear hub 100. In such embodiments, the first sleeve 300 may include a groove to form a keyway and the drive shaft may include an analogous groove to form a keyseat to interface with a corresponding key and secure the first sleeve 300 and driveshaft together. Further connection types may include sets screw engagement with the drive shaft, splines, or a press fit between the driveshaft and the first sleeve 300. Such keyed, set screw, splined, and press fit connections are understood by those skilled in the art. However, the specific design of the present composite hybrid gear assembly allows for implementation of such connections with composite components. Specifically, such connection schemes induce stress concentration during assembly which may be detrimental to the integrity of fiber composite structures. The present hybrid design with the first sleeve 300 fixed to the composite gear hub 100 components overcomes this challenge to assembly by providing a robust and non-composite surface to engage with the driveshaft.

Figure 6:
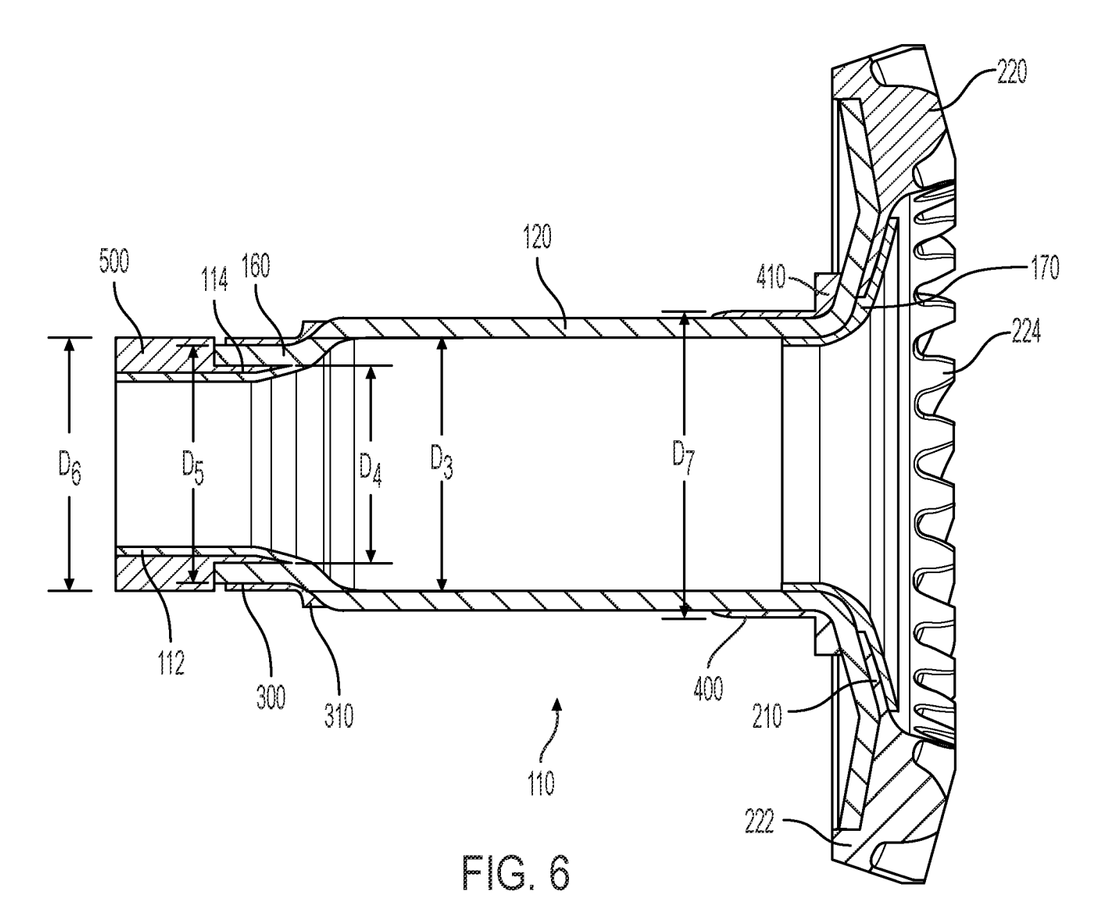
FIG. 6 is an illustration of a cut-view of the composite hybrid gear assembly of FIG. 4 along axis 6-6.

In one or more embodiments and with reference to FIG. 6, the gear hub 100 may further comprise a first composite tab 160 formed from the composite material. The first composite tab 160 comprises a cylindrical geometry coaxial with the first shaft region 112 and extending from the tapered region 140 across at least a portion of an external surface of the first sleeve 300.

In one or more embodiments comprising the first composite tab 160, the first sleeve 300 is fixed to an external surface of the first composite tab 160 in particular. As previously indicated, the first sleeve 300 provides a mating surface to connect a bearing to the gear hub 100. For example, a ball bearing, a roller bearing, or a thrust bearing may be attached to the first sleeve 300 to allow the gear hub 100 to be supported and held in position for operational utility.

In one or more embodiments and with reference to FIG. 6, the first sleeve 300 comprises an internal profile matching the external diameter ($D_5$) of the first composite tab 160 and an external diameter represented by a third external diameter ($D_3$). Specifically, the internal profile of the first sleeve 300 may be sized to provide a snug fit against the first composite tab 160. The snug fit between the first sleeve 300 and the first composite tab 160 allows the first sleeve 300 and the first composite tab 160 to be secured together and form a laminated structure.

Further, in one or more embodiments, the first sleeve 300 may comprise an internal profile matching the external profile of the first composite tab 160 as well as the external profile of at least a portion of the tapered region 140. In doing so, the first sleeve 300 may extend over at least a portion of the tapered region 140 of the gear hub 100.

Extending the first sleeve 300 over at least a portion of the tapered region 140 of the gear hub 100 provides a barrier to longitudinal translation of the first sleeve 300 along the gear hub 100. Specifically, as the tapered region 140 represents a region of increasing diameter of the gear hub 100, the first sleeve 300 may only be translated along the gear hub 100 until a location is reached where the external profile of the gear hub 100 impinges the internal profile of the first sleeve 300.

In one or more embodiments and with reference to both FIG. 3 and FIG. 6, the first sleeve 300 may include a section of increased thickness to form a first stop 310. The section of increased thickness forming the first stop 310 is positioned at the end of the first sleeve 300 proximal the gear head assembly 200. The first stop 310 provides a surface against which a bearing may be abutted to prevent translation of the bearing during operation as a result of the thrust force experienced by the composite hybrid gear assembly 10.

In one or more embodiments, the first sleeve 300 is formed from a metallic material. Metallic materials utilized for the first sleeve 300 may include steel, alloy steels, nickel, brass, bronze, graphite, monel, Inconel, cast iron and titanium. Example alloy steels include nickel-chromium steel, chromium-vanadium steel, and 9310 Alloy steel. The metallic material provides strength to the first sleeve 300 and disperse the stress transfer between the driveshaft and the gear hub 100 when serving as a connection point for the driveshaft as well as provide a contact surface for the press-fit of the bearing without compromising the structural integrity of the composite material forming the gear hub 100.

Figure 7A:
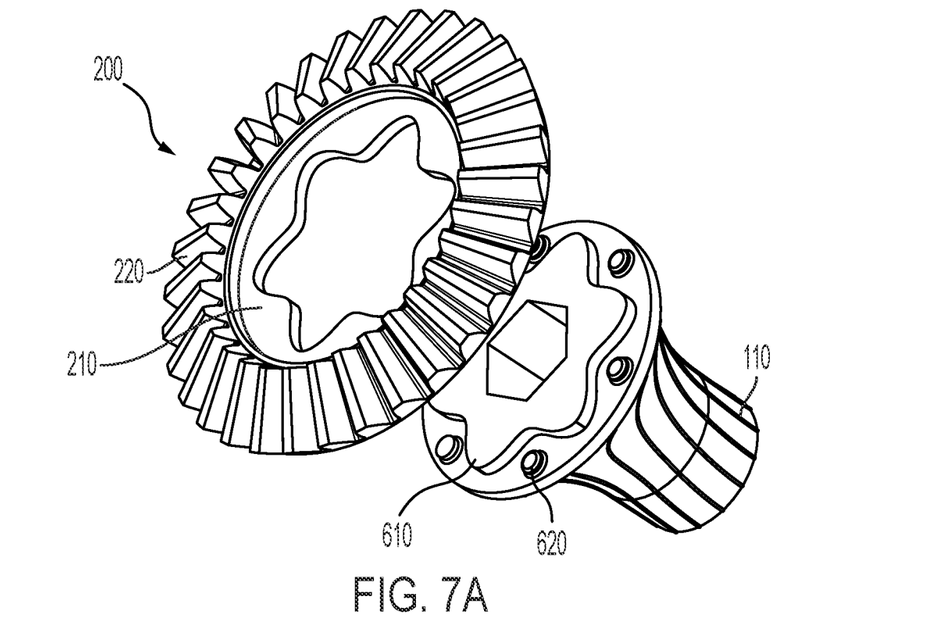
FIG. 7A illustrates a mechanically interlocking geometry of components of a composite gear assembly according to one or more embodiments of the present disclosure.
Figure 7B:
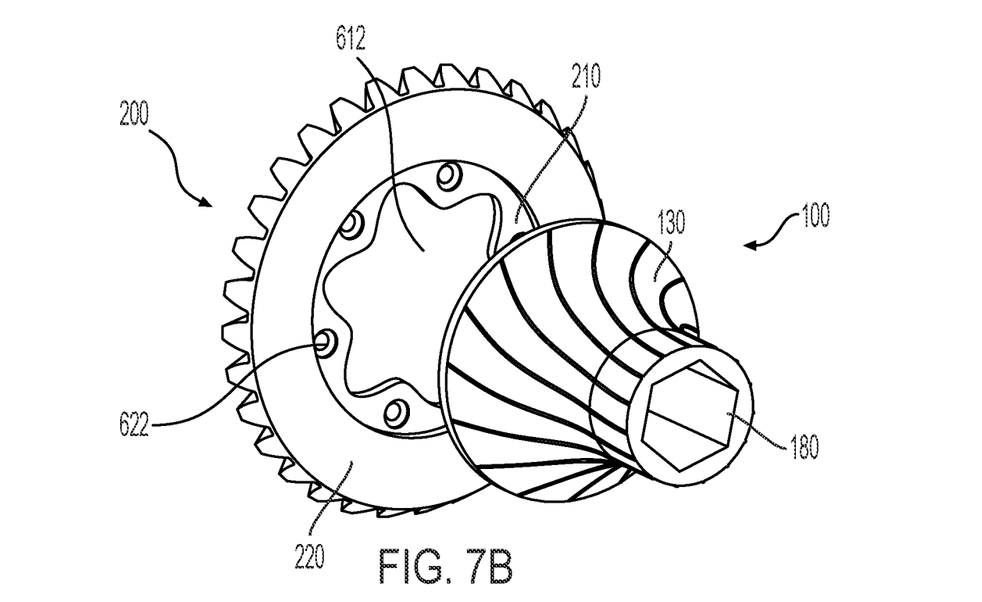
FIG. 7B illustrates a reversed view of FIG. 7B to reveal matching mechanically interlocking geometry of components of a composite gear assembly according to one or more embodiments of the present disclosure.

With reference to FIGS. 7A and 7B, while not illustrated to better allow visualization of the gear hub 100, it is conceived that the first sleeve 300 may be provided on an exterior surface of the shaft region 110 of such embodiment.

With continued reference to FIGS. 7A and 7B, in one or more embodiments the gear hub 100 may comprise an interior geometry that is non-circular to form a driveshaft seat 180. The driveshaft seat 180 may comprise any non-circular geometry to interface with a mating geometry on the driveshaft to form a connection which prevents relative rotational motion. In various embodiments, the driveshaft seat 180 may comprises a profile in the shape of a regular or irregular polygon with an order of "n" where n is 3 or greater (such as 3 to 6, 3 to 8 or 3 to 12) or a lobed shape such as a pentalobe. In one or more embodiments, the driveshaft seat 180 may pass through the entire length of the gear hub 100. In further embodiments, the driveshaft seat 180 may terminate in a blind hole. In yet further embodiments, the driveshaft seat 180 may morph in profile to a circle of other shape or size to reduce the total volume of composite material forming the gear hub 100.

Figure 5:
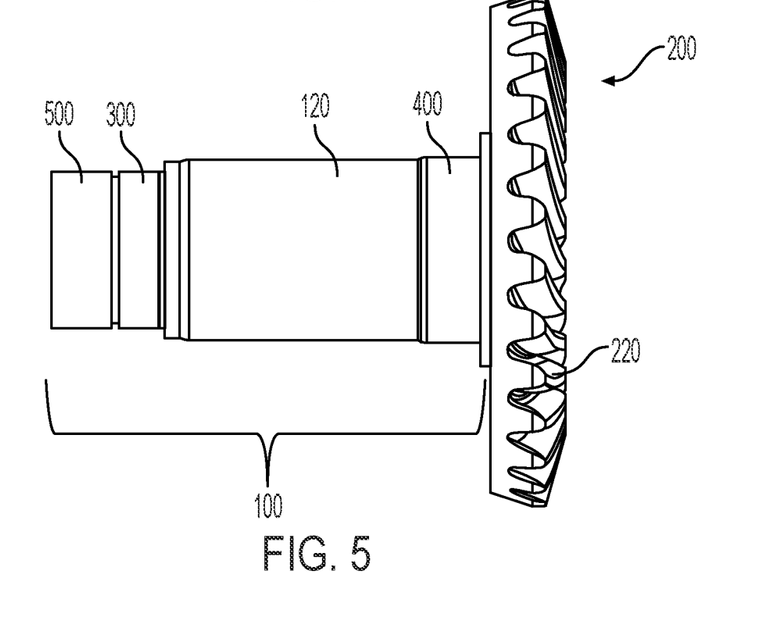
FIG. 5 is an illustration of a side profile of the composite hybrid gear assembly of FIG. 4.

In or more embodiments comprising the first composite tab 160 and with reference to FIGS. 5 and 6, the composite hybrid gear assembly may further comprise a third sleeve 500. The third sleeve 500 provides a connection point to rotationally secure the gear hub 100 to the drive shaft with a separate sleeve independent of the first sleeve 300. In such embodiments, the third sleeve 500 may include a groove to form a keyway and the drive shaft may include an analogous groove to form a keyseat to interface with a corresponding key and secure the third sleeve 500 and driveshaft together. Further connection types may include sets screw engagement with the drive shaft, splines, or a press fit between the driveshaft and the third sleeve 500.

The third sleeve 500 comprises a generally cylindrical profile. With reference to FIGS. 5 and 6, in one or more embodiments, the third sleeve 500 comprises an internal profile matching the external profile of the shaft region 110 and an external diameter represented by the sixth external diameter ($D_6$). Specifically, the internal profile of the third sleeve 500 may be sized to provide a snug fit against the first shaft region 112. The snug fit between the third sleeve 500 and the shaft region 110 allows the third sleeve 500 and the shaft region 110 to be secured together and form a laminated structure. In one or more embodiments, the specific portion of the shaft region 110 to which the third sleeve 500 is affixed is the first shaft region 112.

In one or more embodiments, the third sleeve 500 is formed from a metallic material. Metallic materials utilized for the third sleeve 500 may include steel, alloy steels, nickel, brass, bronze, graphite, monel, Inconel, cast iron and titanium. Example alloy steels include nickel-chromium steel, chromium-vanadium steel, and 9310 Alloy steel. The metallic material provides strength to the third sleeve 500 and disperse the stress transfer between the driveshaft and the gear hub 100 when serving as a connection point for the driveshaft as well as provide a contact surface for the press-fit of the bearing without compromising the structural integrity of the composite material forming the gear hub 100.

Further, in one or more embodiments and with continued reference to FIGS. 5 and 6, the third sleeve 500 may comprise an internal profile matching the external profile of the first shaft region 112 as well as an external profile of at least a portion of the tapered region 140. In doing so, the third sleeve 500 may extend over at least a portion of the tapered region 140 of the gear hub 100. Extending the third sleeve 500 over at least a portion of the tapered region 140 of the gear hub 100 provides a barrier to longitudinal translation of the third sleeve 500 along the gear hub 100. Specifically, as the tapered region 140 represents a region of increasing diameter of the gear hub 100, the third sleeve 500 may only be translated along the gear hub 100 until a location is reached where the external profile of the gear hub 100 impinges the internal profile of the third sleeve 500.

In one or more embodiments and with continued reference to FIG. 6, the third sleeve 500 includes a recessed collar 114 which represents a region of reduced thickness such that the external diameter of the third sleeve 500 is reduced in the region of the recessed collar 114. The external diameter of the recessed collar 114 may be represented by a fourth external diameter ($D_4$) where $D_4$ is less than $D_6$. The reduction in external diameter of the third sleeve 500 in the region of the recessed collar 114 allows the first composite tab 160 to be disposed against the recessed collar 114 such that the first composite tab 160 remains countersunk relative to the sixth external diameter ($D_6$) of the third sleeve 500. Specifically, the first composite tab 160 may have an external diameter represent by a fifth external diameter ($D_5$) with $D_5$ being less than $D_6$. Further, it is noted that in one or more embodiments, the recessed collar 114 may extend from the end of the third sleeve 500 aligned with the tapered region across at least a portion of the first shaft region 112.

The first composite tab 160 forms a sandwiched arrangement of the third sleeve 500. Specifically, a portion of the third sleeve 500 may be disposed between the first shaft region 112 and the first composite tab 160. In one or more embodiments, the portion of the third sleeve 500 disposed between the first shaft region 112 and the first composite tab 160 represents the recessed collar 114. It will be appreciated that such arrangement increases the surface area of mating between the gear hub 100 and the third sleeve 500 such that fixation between the gear hub 100 and the third sleeve 500 may be enhanced.

In one or more embodiments and with continued reference to FIG. 6, the external diameter ($D_3$) of the first sleeve 300 is greater the external diameter ($D_6$) of the third sleeve 500. Provision of a first sleeve 300 having a $D_3$ greater than $D_6$ eliminates potential interference when passing a ball bearing or other device across the third sleeve 500 for fixation to the first sleeve 300. In one or more further embodiments, the external diameter ($D_3$) of the first sleeve 300 is congruent with the external diameter ($D_6$) of the third sleeve 500. Congruence of $D_3$ and $D_6$ provides a consistent transition between the first sleeve 300 and the third sleeve 500.

It will be appreciated that in one or more embodiments, the arrangement as illustrated in FIG. 3 may further comprise a third sleeve 500 disposed at the interior of the first shaft region 112. Positioning the third sleeve 500 at the interior of the first shaft region 112 allows for a solid drive shaft to be press fit into the third sleeve 500 for connection to the gear hub 100. Inclusion of the third sleeve 500 at the interior of the first shaft region 112 may be done in combination with any other embodiment of the present disclosure.

In one or more embodiments and with reference to FIGS. 1 through 6, the composite hybrid gear assembly further comprises a second sleeve 400. The second sleeve 400 is fixed to the external surface of the second shaft region 122 of the gear hub 100. The second sleeve 400 provides a mating surface to connect a thrust bearing, a roller bearing, or a ball bearing or other device to the gear hub 100. For example, a thrust bearing may be attached to the second sleeve 400 to allow the gear hub 100 to be supported and held in position for operational utility.

The second sleeve 400 comprises a generally cylindrical profile. In one or more embodiments, the second sleeve 400 comprises an internal profile matching the second external diameter ($D_2$) of the second shaft region 120 and an external diameter represented by a seventh external diameter ($D_7$). Specifically, the internal profile of the second sleeve 400 may be sized to provide a snug fit against the second shaft region 120. The snug fit between the second sleeve 400 and the second shaft region 120 allows the second sleeve 400 and the second shaft region 120 to be secured together and form a laminated structure.

Further, in one or more embodiments, the second sleeve 400 may comprise an internal profile matching the second external diameter ($D_2$) of the second shaft region 120 as well as an external profile of the hub web region 130. In doing so, the second sleeve 400 may extend over at least a portion of the hub web region 130 of the gear hub 100. Extending the second sleeve 400 over at least a portion of the hub web region 130 of the gear hub 100 provides a barrier to longitudinal translation of the second sleeve 400 along the gear hub 100. Specifically, as the hub web region 130 represents a region of increasing diameter of the gear hub 100, the second sleeve 400 may only be translated along the gear hub 100 until a location is reached where the external profile of the gear hub 100 impinges the internal profile of the second sleeve 400.

In one or more embodiments and with reference to both FIG. 3 and FIG. 6, the second sleeve 400 may include a section of increased thickness forming a second stop 410. The section of increased thickness forming the second stop 410 is positioned at the end of the second sleeve 400 proximal the gear head assembly 200. The second stop 410 provides a surface against which a bearing may be abutted to prevent translation of the bearing during operation as a result of the thrust force experienced by the composite hybrid gear assembly 10.

In one or more embodiments, the second sleeve 400 is formed from a metallic material. Metallic materials utilized for the second sleeve 400 may include steel, alloy steels, nickel, brass, bronze, graphite, monel, Inconel, cast iron and titanium. Example alloy steels include nickel-chromium steel, chromium-vanadium steel, and 9310 Alloy steel. The metallic material provides strength to the second sleeve 400 and disperse the stress transfer between the driveshaft and the gear hub 100 when serving as a connection point for the driveshaft as well as provide a contact surface for the press-fit of the bearing without compromising the structural integrity of the composite material forming the gear hub 100.

The gear head assembly 200 comprises the head web region 210 and the teeth region 220. The gear head assembly 200 is fixed to the gear hub 100 to form a complete gear. In one or more embodiments, the head web region 210 of the gear head assembly 200 is fixed to a surface of the hub web region 130 of the gear hub 100 contiguous with an internal surface of the shaft region 110. In one or more specific embodiments, the head web region 210 of the gear head assembly 200 is fixed to a surface of the hub web region 130 of the gear hub 100 contiguous with an internal surface of the second shaft region 120.

In one or more embodiments, the teeth region 220 is formed from an annular ring 222 and a plurality of teeth 224 affixed to the annular ring 222. The teeth 224 may be integral with the annular ring 222 in one or more embodiments. In one or more embodiments, the annular ring 222 includes a recessed channel 230 on a face of the annular ring 222 opposed a face comprising the teeth 224. The recessed channel 230 provides a cavity for acceptance of the hub web region 130 of the gear web 100. It will be appreciated that disposing the hub web region 130 of the gear web 100 in the cavity formed by the recessed channel 230 enhances the strength of the connection between the gear hub 100 and the gear head assembly 200 as well as shields the composite material of the gear hub 100. For example, the gear head assembly 200 and the gear hub 100 are prevented from translating relative to the other as the hub web region 130 of the gear web 100 would abut against the walls of the recessed channel 230. Further, as the hub web region 130 is inset into the cavity formed by the recessed channel 230 the termination of the fiber composite forming the gear hub 100 at the ends of the hub web region 130 are shielded from abrasion and/or impact by the gear head assembly 200. Additionally, the annular ring 222 provides increased stiffness to the teeth region 220 of the gear head assembly 200.

In one or more embodiments, the gear head assembly 200 is formed from a metallic material. Metallic materials utilized for the gear head assembly 200 may include steel, alloy steels, nickel, brass, bronze, graphite, monel, Inconel, cast iron and titanium. Example alloy steels include nickel-chromium steel, chromium-vanadium steel, and 9310 Alloy steel. The metallic material provides strength and wear resistance to the gear head assembly 200 and specifically the teeth region 220.

In one or more embodiments, the composite hybrid gear assembly 10 is a bevel gear system. Specifically, the teeth region 220 of the gear head assembly 200 may be provided in a configuration such that the complete composite hybrid gear assembly 10 serves as a bevel gear. It will be appreciated by one skilled in the art that bevel gears are gears where the axes of the two shafts connected to the gears intersect and the tooth-bearing faces of the gears themselves are conically shaped. Bevel gears are most often mounted on shafts that are 90 degrees apart, but can be designed to work at other angles as well. In accordance with various embodiments, the teeth region 220 of the gear head assembly 200 may be configured for shafts that are mounted 10 to 170 degrees apart, 25 to 155 degrees apart, 40 to 140 degrees apart, 60 to 120 degrees apart, 80 to 100 degrees apart, 85 to 95 degrees apart, or approximately 90 degrees apart with coincident shafts representing a splay of 0 degrees and co-linear abutting shafts represent a splay of 180 degrees.

The configuration and orientation of the teeth 224 for a bevel gear operational at each of the recited axis orientations may be calculated and determined by one skilled in the art. However, it will be appreciated that as a result of the loading and forces experienced by a bevel gear, including the hub and connection to the shaft of such bevel gear, only certain gears are capable of operating such orientations. The composite hybrid gear assembly 10 are considered capable of operating in such orientations while still comprising composite materials as a result of the specific designs and unique aspects disclosed with regards to the components and assembly of the presently disclosed composite hybrid gear assembly 10.

In one or more embodiments, gear hub 100 comprises a second composite tab 170 formed from the composite material. The second composite tab 170 may extend from the internal surface of the second shaft region 120 across at least a portion of the head web region 210 of the gear head assembly 200. It will be appreciated that such arrangement provides a substantially conical shape to the second composite tab 170.

The second composite tab 170 forms a sandwiched arrangement of at least a portion of the head web region 210 of the gear head assembly 200. Specifically, a portion of at least a portion of the head web region 210 of the gear head assembly 200 is disposed the hub web region 130 and the second composite tab 170 of the gear hub 100. It will be appreciated that such arrangement increases the surface area of mating between the gear hub 100 and the gear head assembly 200, specifically the head web region 210 of the gear head assembly 200, such that fixation between the gear hub 100 and the gear head assembly 200 may be enhanced.

In one or more embodiments, the hub web region 130 of the gear hub 100 and the head web region 210 of the gear head assembly 200 may comprise areas of opposing geometry to interlock and impede rotational motion between the hub web region 130 and the head web region 210. With reference to FIGS. 7A and 7B, an illustration of such arrangement is illustrated. A generic gear hub and a generic gear head assembly are provided in FIGS. 7A and 7B while illustrating the opposing geometry to interlock and impede rotational motion between the hub web region 130 of the gear hub 100 and the head web region 210 of the gear head assembly 200.

In one or more embodiments, the opposing geometry may comprise a raised boss 610 along with an opposing cutout 612. It will be appreciated that such raised boss 610 and opposing cutout 612 may comprise any of various profiles including a polygon, pentalobe, or oval. The only limitation is machinability of the geometry.

In one or more embodiments, the opposing geometry may comprise a raised pin 620 along with a receiving cavity 622. It will be appreciated that such raised pin 620 and opposing receiving cavity 622 may comprise any of various profiles including circular, pentalobe, oval, or the hexalobe as illustrated in FIGS. 7A and 7B. The only limitation is machinability of the geometry.

It will be appreciated that while the raised pin 620 is illustrated in FIGS. 7A and 7B as part of the gear hub 100 and the receiving cavity 622 are illustrated in FIGS. 7A and 7B as part of as part of the gear head assembly 200 they may alternatively be provided in the opposite arrangement. Specifically, the receiving cavity 622 may be provided as part of the gear hub 100 and the raised pin 620 may be provided as part of the gear head assembly 200. Further, the raised pin 620 and the receiving cavity 622 may also be present on both the gear hub 100 and the gear head assembly 200.

In one or more embodiments, the opposing geometry may comprise the raised boss 610 and the opposing cutout 612 as well as the raised pin 620 along with the receiving cavity 622. Placement may be made on the gear hub 100 and the gear head assembly 200 in all the various permutations.

In one or more embodiments, the gear hub 100 is fixed to one or more of the gear head assembly 200, the first sleeve 300, the second sleeve 400, and the third sleeve 500 with an adhesive. Specifically, an adhesive may be provided on at least a portion of the mating surfaces between the gear hub 100 and the first sleeve 300, the gear hub 100 and the second sleeve 400, the gear hub 100 and the gear head assembly 200, the first composite tab 160 and the first sleeve 300, the first composite tab 160 and the third sleeve 500, and the gear head assembly 200 and the second composite tab 170. Connection of the various components with adhesive eliminates fasteners or other items which may diminish the structural integrity of the composite material forming the gear hub 100.

In various embodiments, the adhesive may be thermally cured epoxy resins, one part resins, or two parts resins. Examples of one part resins include CYCOM PR 520, CYCOM 890, and PRISM EP2400 (each commercially available from Solvay S.A., Brussels, Belgium) as well as Hexflow RTM230 ST and Hexflow RTM6 (each commercially available from Hexcel, Stamford, Conn.). Examples of two part resins include PRIME 180 (commercially available from Gurit, Wattwil, Switzerland) and Hexflow VRM37 (commercially available from Hexcel, Stamford, Conn.). Selected resins preferably have high fracture toughness for durability, fatigue resistance, and interlaminar shear. Selected resins also preferably include a wet Tg higher than 250 F.

In one or more embodiments, the composite material forming the various parts of the gear hub 100 comprise a fiber reinforced polymer composite. Fiber reinforced polymer composite is a composite material made of a polymer matrix reinforced with fibers. In various embodiments, the fibers may be fiberglass, carbon fibers, aramid fibers, or their combinations. For example, carbon fiber may be utilized to provide a desired balance of stiffness and toughness, but fiberglass or aramid fiber layers may be additionally utilized to provide impact resistance or other properties of interest. The specific fiber type and combinations may be selected to best suit the requirements in constructing different portion of the gear hub 100.

In one or more embodiments, the fiber reinforced polymer composite forming the various parts of the gear hub 100 may comprise a fiber preform infused or embedded with resin. Specifically, the fiber preform may comprise a dry fiber preform subsequently infused with resin or may comprise a prepreg already embedded with resin. As known to one skilled in the art, prepreg is a composite material made from "pre-impregnated" fibers and a partially cured polymer matrix. Preparation of a fiber preform allows for the fiber orientation, number of layers, and other parameters of the fiber layup to be managed and selected to maximize the desired mechanical properties of the gear hub 100 while concurrently minimizing weight.

In one or more embodiments, the fiber preform may comprise braided carbon fiber. Braided carbon fiber comprises a cylindrical tube of carbon fiber strands braided together to form a continuous tube. Braided carbon fiber tubing has the ability to have the diameter expanded or reduced by reorienting the orientation of the braided fibers. This allows for the various external diameters recited for various regions of the gear hub 100 to be formed from a single continuous braided carbon fiber tube. For example, a mandrel with the desired profile for the gear hub 100 may be machined and subsequently the mandrel may be utilized as a form to retain the braided carbon fiber tube in the profile desired for the gear hub 100 during the resin infusion and curing process. Braided carbon fiber tubing provides a desirable benefit of maintaining continuous fibers along the length of the braid achieving improved load transfer throughout the whole gear hub 100.

In one or more embodiments, the fiber preform may be formed from woven or unidirectional fiber cut to shape and formed into a desired geometry. Specifically, tailored fiber placement (TFP) process may be used to attach (for example, sewn or stitch) individual tows of fibers to a flat woven fiber sheet in a defined geometry or orientation to build up a preform having the desired geometry of the gear hub 100. It is noted that TFP process allows for the orientation of the fibers within the fiber preform to be selected to be selected to be along defined paths aligning with the anticipated structural load path of the composite hybrid gear assembly 10. For example, the resulting fiber preform made with the TFP process may result in fiber orientation in a fan, curved fan, or spiral fan pattern at the hub-web region of the composite gear hub. Furthermore, different fiber types (for example, carbon fiber and/or glass fiber) may be mixed in the TFP process when attaching fibers to the woven fiber sheet for tailoring mechanical properties of the resulting composite.

With tailored fiber placement, the fiber placement may initially be created using automated fiber placement methods in a flat pattern to obtain desirable reinforcement fiber orientation which varies throughout the formed fiber sheet. The resulting fiber sheets may then be used in a flat or three dimensional orientation, in a dry or prepreg format. In further embodiments, the automated fiber placement methods may be used directly to create a three dimensional pattern in dry or prepreg format to obtain desirable reinforcement fiber orientation without requiring assembly or three dimensional orienting of the formed fiber sheet.

In one or more embodiments, tows of fiber may be added to the fiber preform along defined paths aligning with the anticipated structural load path of the composite hybrid gear assembly. These additional tows of fiber may be added to embodiments utilizing the braided carbon fiber preform as well as embodiments utilizing a fiber preform which is formed from woven or unidirectional fiber cut to shape before being formed into the desired geometry. The additional tows of fiber provide continuous strands of fiber along the entire length of the gear hub 100 and help with strengthening along the main path of loading.

It will be appreciated that the various types of fiber preforms discussed may also be used in combination. For example, in one or more embodiments, higher modulus, unidirectional carbon fiber may be used in construction of shaft region 110 of the gear hub 100 while a woven fabric preformed interlaced with the fibers forming the shaft regions may be used to construct the hub web region 130 of the gear hub 100. Further, the first shaft region 112 and the second shaft region 120 may be formed from different types of fiber preforms. As the two portions of the gear hub 100 may be co-cured together with infused resin the gear hub 100 may be integrated into a single unit. In further embodiments, a braided carbon fiber may be utilized to form a first layer of the gear hub 100 and TFP may be utilized to form a second layer of the gear hub 100. The combination of braided carbon fiber and TFP provides the continuous fibers of the braided carbon fiber as well as the specifically oriented fibers of the TFP. Further, the TFP may provide thickening backing for areas where the braid tapers or is spread in a non-desired manner.

In one or more embodiments, the thickness of the walls of the gear hub 100 may vary across its length. Specifically, the preform may be provided at a greater thickness in areas where greater stress is anticipated to provide additional strength to the gear hub 100. The thickness of the gear hub 100 may be varied by including additional layers of fiber in the preform.

In various embodiments, the resin infused into the fiber preform may be selected from epoxies, bismaleimide, cyanate ester, benzoxazine, and vinyl hybrids.

Having described the various features of the composite hybrid gear assembly 10, attention will now be drawn to methods of making the composite hybrid gear assembly 10. The gear hub 100 may be formed using traditional resin transfer molding processes. Various resin transfer molding processes include Resin Transfer Molding (RTM), Vacuum Assisted Resin Transfer Molding (VARTM), and Same Qualified Resin Transfer Molding (SQRTM) processes. Each of these processes are known to those skilled in the art and as such are not provided in detail in the present disclosure.

In one or more embodiments, the gear hub 100 may be prepared and subsequently assembled with the gear head assembly 200, the first sleeve 300, and the second sleeve 400. Preparing the gear hub 100 initially comprises constructing a dry fiber reinforced preform of the gear hub 100. Subsequently, the dry fiber reinforced preform of the gear hub 100 may be laid in a molding tool followed by infusing uncured resin under pressure or vacuum into the dry fiber reinforced preform to form an uncured gear hub. Finally, the resin in the uncured gear hub may be cured to form the gear hub 100. Alternatively, a composite prepreg may be laid in a molding tool to form an uncured gear hub with subsequent curing of the prepreg to form the gear hub 100. Assembling the gear hub 100 with the gear head assembly 200, the first sleeve 300, and the second sleeve 400 to form the composite hybrid gear assembly 10 is achieved by applying the adhesive to the mating surfaces between the gear hub 100 and each of the gear head assembly 200, the first sleeve 300, and the second sleeve 400 and retaining the components in contact while the adhesive sets.

In one or more embodiments, the adhesive may be applied to the mating surfaces of the gear head assembly 200, the first sleeve 300, and the second sleeve 400 prior to mating them with the dry fiber reinforced preform of the gear hub 100 in the molding tool and subsequent resin infusion to allow the adhesive to set concurrently with the curing of the infused resin. It is specifically noted that the adhesive is applied to the metallic surfaces and not to the preform. Specifically, the adhesive may be applied to each of the mating surfaces and the dry fiber reinforced preform of the gear hub 100 may be laid in a molding tool along with the gear head assembly 200, the first sleeve 300, and the second sleeve 400 so that the dry fiber reinforced preform conforms exactly to the geometry of each of the gear head assembly 200, the first sleeve 300, and the second sleeve 400. Additionally, the adhesive may be concurrently set with the curing of the resin infused into the dry fiber reinforced preform such that the complete composite hybrid gear assembly 10 is formed in the molding tool. It will be appreciated that assembling the composite hybrid gear assembly 10 within the molding tool allows for geometries of the gear hub 100 which would interfere with assembly of the composite hybrid gear assembly 10 subsequent to resin curing.

In one or more embodiments, a method of making the composite hybrid gear assembly 10 comprises mating the dry fiber reinforced preform and the gear head assembly 200 comprising a metallic material such that at least a portion of a head web region 210 of the gear head assembly 200 is sandwiched between layers of the dry fiber reinforced preform. It will be appreciated that embodiments which include the second composite tab 170 as illustrated in FIG. 6 utilize such an assembly arrangement. Additionally, adhesive is applied to regions of contact between the gear hub 100 and the gear head assembly 200 prior to laying the dry hybrid gear assembly with added adhesive in a molding tool. Afterward, uncured resin is infused into the dry fiber reinforced preform to form an uncured hybrid gear assembly which is subsequently cured to both set the adhesive and cure the resin. In one or more embodiments, the method may further comprise fixing the first sleeve 300 as illustrated in FIG. 3 to an external surface of the first shaft region 116 of the gear hub 100 and a second sleeve 400 to an external surface of the second shaft region 120 of the gear hub 100 with the adhesive.

In one or more embodiments, a method of making the composite hybrid gear assembly 10 comprises mating the dry fiber reinforced preform with the first sleeve 300 and the third sleeve 500 to sandwich at least a portion of the third sleeve 500 between the first shaft region 112 and the first composite tab 160 and at least a portion of the first composite tab 160 between the third sleeve 500 and the first sleeve 300 in forming the dry composite hybrid gear assembly. It will be appreciated that an example embodiment which includes the first composite tab 160 and the described layering is illustrated in FIG. 6. Additionally, adhesive is applied to regions of contact between the gear hub 100 and the first sleeve 300 and regions of contact between the gear hub 100 and the third sleeve 500 prior to laying the dry hybrid gear assembly with added adhesive in a molding tool. It is once again specifically noted that the adhesive is applied to the metallic surfaces and not to the preform. Afterward, uncured resin is infused into the dry fiber reinforced preform to form an uncured hybrid gear assembly which is subsequently cured to both set the adhesive and cure the resin. In one or more embodiments, the method may further comprise fixing the second sleeve 400 to the external surface of the second shaft region 120 of the gear hub 100 with the adhesive.

It will be appreciated that embodiments of the method of making the composite hybrid gear assembly may also include a combination of the above disclosed co-curing and bonding methods. Specifically, methods may include co-curing where the adhesive is applied prior to curing the resin such that the adhesive and resin are cured concurrently with multiple components of the composite hybrid gear assembly 10 pre-assembled as well as include bonding methods where the gear hub 100 is cured and is subsequently fixed to metallic components of the composite hybrid gear assembly 10 with adhesive. For example, the gear head assembly 200 may be co-cured with the gear hub 100 and the first sleeve 300 may be bonded subsequently.

Having described various embodiments, it should be understood that the various aspects of the composite hybrid gear assembly and method of making the same are described and such aspects may be utilized in conjunction with various other aspects.

In a first aspect, the disclosure provides a composite hybrid gear assembly. The composite hybrid gear assembly comprises a gear hub formed from a composite material, the gear hub comprising a shaft region having an axially symmetrical external profile and a hub web region having a flared profile extending from the shaft region; a gear head assembly comprising a head web region and a teeth region, the gear head assembly fixed to the gear hub; a first sleeve fixed to an external surface of the first shaft region of the gear hub; and a second sleeve fixed to an external surface of the second shaft region of the gear hub.

In a second aspect, the disclosure provides the composite hybrid gear assembly of the first aspect, in which the shaft region comprises a first shaft region having an axially symmetrical external profile of a first external diameter and a second shaft region having an axially symmetrical external profile of a second external diameter coaxial with the first shaft region extending from the first shaft region.

In a third aspect, the disclosure provides the composite hybrid gear assembly of the second aspect, in which the second external diameter of the second shaft region is larger than the first external diameter of the first shaft region.

In a fourth aspect, the disclosure provides the composite hybrid gear assembly of the third aspect, in which the first shaft region and the second shaft region are connected with a tapered region expanding from the first external diameter of the first shaft region to the second external diameter of the second shaft region.

In a fifth aspect, the disclosure provides the composite hybrid gear assembly of the fourth aspect, in which the first sleeve extends over at least a portion of the tapered region and comprises an internal profile matching the first external diameter of the first shaft region and an external profile of the tapered region.

In a sixth aspect, the disclosure provides the composite hybrid gear assembly of any of the second through fifth aspects, in which the composite hybrid gear assembly further comprises a second sleeve, the second sleeve extending over at least a portion of the hub web region and comprising an internal profile matching the second external diameter of the second shaft region and an external profile of the hub web region.

In a seventh aspect, the disclosure provides the composite hybrid gear assembly of any of the first through sixth aspects, in which the composite hybrid gear assembly further comprises a third sleeve, the third sleeve fixed to the shaft region of the gear hub.

In an eighth aspect, the disclosure provides the composite hybrid gear assembly of the seventh aspect, in which the third sleeve is fixed to the external surface of the shaft region of the gear hub.

In a ninth aspect, the disclosure provides the composite hybrid gear assembly of the seventh aspect, in which the third sleeve is fixed to an internal surface of the shaft region of the gear hub.

In a tenth aspect, the disclosure provides the composite hybrid gear assembly of any of the first through ninth aspects, in which the gear hub is fixed to the gear head assembly and the first sleeve with an adhesive.

In an eleventh aspect, the disclosure provides the composite hybrid gear assembly of the eighth aspect, in which the shaft region comprises: a first shaft region having an axially symmetrical external profile of a first external diameter; a second shaft region having an axially symmetrical external profile of a second external diameter coaxial with the first shaft region and extending from the first shaft region, where the second external diameter of the second shaft region is larger than the first external diameter of the first shaft region; a tapered region expanding from the first external diameter of the first shaft region to the second external diameter of the second shaft region to connect the first shaft region and the second shaft region; and a first composite tab formed from the composite material, the first composite tab comprising an axially symmetrical geometry coaxial with the first shaft region and extending from the tapered region across at least a portion of an external surface of the third sleeve.

In a twelfth aspect, the disclosure provides the composite hybrid gear assembly of the eleventh aspect, in which the first sleeve is fixed to an external surface of the first composite tab.

In a thirteenth aspect, the disclosure provides the composite hybrid gear assembly of any of the first through twelfth aspects, in which the head web region of the gear head assembly is fixed to a surface of the hub web region of the gear hub contiguous with an internal surface of the shaft region.

In a fourteenth aspect, the disclosure provides the composite hybrid gear assembly of the thirteenth aspect, in which the gear hub further comprises a second composite tab formed from the composite material, the second composite tab extending from the internal surface of the shaft region across at least a portion of the head web region of the gear head assembly to sandwich the at least a portion of the head web region of the gear head assembly between the hub web region and the second composite tab.

In a fifteenth aspect, the disclosure provides the composite hybrid gear assembly of any of the first through fourteenth aspects, in which the composite material comprises a fiber reinforced polymer composite.

In a sixteenth aspect, the disclosure provides the composite hybrid gear assembly of the fifteenth aspect, in which the fiber reinforced polymer composite comprises a fiber preform embedded in cured resin.

In a seventeenth aspect, the disclosure provides the composite hybrid gear assembly of the sixteenth aspect, in which the fiber preform comprises braided carbon fiber.

In an eighteenth aspect, the disclosure provides the composite hybrid gear assembly of the sixteenth aspect, in which the fiber preform is formed from woven or unidirectional fiber cut to shape and formed into a desired geometry.

In a nineteenth aspect, the disclosure provides the composite hybrid gear assembly of the sixteenth, in which tows of fiber are added to the fiber preform along defined paths aligning with the anticipated structural load path of the composite hybrid gear assembly.

In a twentieth aspect, the disclosure provides the composite hybrid gear assembly of any of the first through nineteenth aspects, in which the hub web region and the head web region comprise areas of opposing geometry to interlock and impede rotational motion between the hub web region and the head web region.

In a twenty-first aspect, the disclosure provides the composite hybrid gear assembly of any of the first through twentieth aspects, in which the composite hybrid gear assembly is a bevel gear system.

In a twenty-second aspect, the disclosure provides a method of making a composite hybrid gear assembly. The method comprises applying adhesive to a gear head assembly at the regions of contact between a gear hub and the gear head assembly, where the gear head assembly comprises a metallic material; constructing a preform comprising a dry fiber or a prepreg of the gear hub in a molding tool, the gear hub comprising a first shaft region having an axially symmetrical profile of a first external diameter, a second shaft region having an axially symmetrical profile of a second external diameter coaxial with the first shaft region and extending from the first shaft region, and a hub web region having a flared profile extending from the second shaft region; mating the preform and the gear head assembly to sandwich at least a portion of a head web region of the gear head assembly between layers of the fiber reinforced preform to form a composite layup of hybrid gear assembly; infusing uncured resin into the preform if the preform comprises the dry fiber; and curing the preform.

In a twenty-third aspect, the disclosure provides the method of making a composite hybrid gear assembly of the twenty-second aspect, in which the method further comprises fixing a first sleeve to an internal or external surface of the first shaft region of the gear hub and a second sleeve to an external surface of the second shaft region of the gear hub with the adhesive.

In a twenty-fourth aspect, the disclosure provides a method of making a composite hybrid gear assembly. The method comprises applying adhesive to a gear head assembly, a first sleeve, a second sleeve, and a third sleeve at the regions of contact between a gear hub and each of the first sleeve, the second sleeve, and the third sleeve, where the gear head assembly, the first sleeve, the second sleeve, and the third sleeve each comprise metallic material; constructing a preform comprising a dry fiber or a prepreg of the gear hub in a molding tool, the gear hub comprising a first shaft region having an axially symmetrical profile of a first external diameter, a second shaft region having an axially symmetrical profile of a second external diameter coaxial with the first shaft region and extending from the first shaft region, and a hub web region having a flared profile extending from the second shaft region; where the first shaft region and the second shaft region are connected with a tapered region expanding from the first external diameter of the first shaft region to the second external diameter of the second shaft region and the gear hub further comprises a first composite tab formed from the composite material, where the first sleeve is fixed to an external surface of the first composite tab; the second sleeve is fixed to an external surface of the second shaft region of the gear hub; the third sleeve is fixed to an external surface of the first shaft region of the gear hub; and the first composite tab comprises an axially symmetrical geometry coaxial with the first shaft region and extending from the tapered region across at least a portion of an external surface of the third sleeve; mating the preform with the first sleeve and the third sleeve to sandwich at least a portion of the third sleeve between the first shaft region and the first composite tab and at least a portion of the first composite tab between the first sleeve and the third sleeve to form a composite layup of hybrid gear assembly; infusing uncured resin into the preform if the preform comprises the dry fiber; and curing the preform.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Throughout the present disclosure the terms "internal" and "external" (along with their variations) are used to reference the positioning of various surfaces. The utilization of the term "internal" means the surface which would be considered the interior or inner surface of the closed or partially-closed geometry. Conversely, utilization of the term "external" means the surface which would be considered the exterior or outer surface of the closed or partially-closed geometry. For example, a pipe represents a cylinder having an internal surface in contact with the flow through the pipe and an external surface in contact with the atmosphere surrounding the pipe.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A composite hybrid gear assembly comprising:
   a gear hub formed from a composite material, the gear hub comprising a shaft region having an axially symmetrical external profile and a hub web region having a flared profile extending from the shaft region;
   a gear head assembly comprising a head web region and a teeth region, the gear head assembly fixed to the gear hub, where the head web region of the gear head assembly is fixed to a surface of the hub web region of the gear hub contiguous with an internal surface of the shaft region; and
   a first sleeve fixed to an external surface of the shaft region of the gear hub;
   where the first sleeve and the gear head assembly are formed from a metallic material.

2. The composite hybrid gear assembly of claim 1, where the shaft region comprises a first shaft region having an axially symmetrical external profile of a first external diameter and a second shaft region having an axially symmetrical external profile of a second external diameter coaxial with the first shaft region extending from the first shaft region.

3. The composite hybrid gear assembly of claim 2, where the second external diameter of the second shaft region is larger than the first external diameter of the first shaft region.

4. The composite hybrid gear assembly of claim 3, where the first shaft region and the second shaft region are connected with a tapered region expanding from the first external diameter of the first shaft region to the second external diameter of the second shaft region.

5. The composite hybrid gear assembly of claim 4, where the first sleeve extends over at least a portion of the tapered region and comprises an internal profile matching the first external diameter of the first shaft region and an external profile of the tapered region.

6. The composite hybrid gear assembly of claim 2, where the composite hybrid gear assembly further comprises a second sleeve, the second sleeve extending over at least a portion of the hub web region and comprising an internal profile matching the second external diameter of the second shaft region and an external profile of the hub web region.

7. The composite gear assembly of claim 6, where the composite hybrid gear assembly further comprises a third sleeve, the third sleeve fixed to the shaft region of the gear hub.

8. The composite gear assembly of claim 7, where the third sleeve is fixed to the external surface of the shaft region of the gear hub.

9. The composite gear assembly of claim 7, where the third sleeve is fixed to an internal surface of the shaft region of the gear hub.

10. The composite hybrid gear assembly of claim 1, where the gear hub is fixed to the gear head assembly and the first sleeve with an adhesive.

11. The composite hybrid gear assembly of claim 8, where the shaft region comprises:
    a first shaft region having an axially symmetrical external profile of a first external diameter;
    a second shaft region having an axially symmetrical external profile of a second external diameter coaxial with the first shaft region and extending from the first shaft region, where the second external diameter of the second shaft region is larger than the first external diameter of the first shaft region;
    a tapered region expanding from the first external diameter of the first shaft region to the second external diameter of the second shaft region to connect the first shaft region and the second shaft region; and
    a first composite tab formed from the composite material, the first composite tab comprising an axially symmetrical geometry coaxial with the first shaft region and extending from the tapered region across at least a portion of an external surface of the third sleeve.

12. The composite hybrid gear assembly of claim 11, where the first sleeve is fixed to an external surface of the first composite tab.

13. The composite hybrid gear assembly of claim 1, where the gear hub further comprises a second composite tab formed from the composite material, the second composite tab extending from the internal surface of the shaft region across at least a portion of the head web region of the gear head assembly to sandwich the at least a portion of the head web region of the gear head assembly between the hub web region and the second composite tab.

14. The composite hybrid gear assembly of claim 1, where the composite material comprises a fiber reinforced polymer composite.

15. The composite hybrid gear assembly of claim 14, where the fiber reinforced polymer composite comprises a fiber preform embedded in cured resin.

16. The composite hybrid gear assembly of claim 15, where the fiber preform comprises braided carbon fiber.

17. The composite hybrid gear assembly of claim 15, where the fiber preform is formed from woven or unidirectional fiber cut to shape.

18. The composite hybrid gear assembly of claim 15, where tows of fiber are added to the fiber preform along defined paths aligning with the anticipated structural load path of the composite hybrid gear assembly.

19. The composite hybrid gear assembly of claim 1, where the composite hybrid gear assembly is a bevel gear system.

\* \* \* \* \*